US009792553B2

(12) United States Patent
Kapur et al.

(10) Patent No.: US 9,792,553 B2
(45) Date of Patent: Oct. 17, 2017

(54) FEATURE EXTRACTION AND MACHINE LEARNING FOR EVALUATION OF IMAGE- OR VIDEO-TYPE, MEDIA-RICH COURSEWORK

(71) Applicant: Kadenze, Inc., Valencia, CA (US)

(72) Inventors: Ajay Kapur, Valencia, CA (US); Perry Raymond Cook, Jacksonville, OR (US); Jordan Hochenbaum, Valencia, CA (US); Colin Bennett Honigman, Los Angeles, CA (US); Owen Skipper Vallis, Valencia, CA (US); Chad A. Wagner, Pasadena, CA (US); Eric Christopher Heep, Val Verde, CA (US)

(73) Assignee: Kadenze, Inc., Valencia, CA (US)

( * ) Notice: Subject to any disclaimer, the term of this patent is extended or adjusted under 35 U.S.C. 154(b) by 355 days.

(21) Appl. No.: 14/461,310

(22) Filed: Aug. 15, 2014

(65) Prior Publication Data
US 2015/0066820 A1 Mar. 5, 2015

Related U.S. Application Data

(63) Continuation-in-part of application No. 14/448,579, filed on Jul. 31, 2014.
(Continued)

(51) Int. Cl.
*G06E 1/00* (2006.01)
*G06E 3/00* (2006.01)
(Continued)

(52) U.S. Cl.
CPC ............. *G06N 5/04* (2013.01); *G06N 99/005* (2013.01)

(58) Field of Classification Search
CPC .. G06E 1/00; G06E 3/00; G06F 15/18; G06G 7/00; G06N 3/02; G06N 5/04; G06N 99/005
(Continued)

(56) References Cited

U.S. PATENT DOCUMENTS

| 2006/0251385 | A1* | 11/2006 | Hwang | ............. | G06F 17/30787 |
| | | | | | 386/214 |
| 2009/0173213 | A1* | 7/2009 | Jiang | ...................... | G09B 15/02 |
| | | | | | 84/484 |

(Continued)

OTHER PUBLICATIONS

'An Introduction to Support Vector Machines and other kernel-based learning methods': Cristianini, Cambridge Press, 2005.*
(Continued)

*Primary Examiner* — Stanley K Hill
*Assistant Examiner* — Peter Coughlan
(74) *Attorney, Agent, or Firm* — Haynes and Boone, LLP

(57) ABSTRACT

Conventional techniques for automatically evaluating and grading assignments are generally ill-suited to evaluation of coursework submitted in media-rich form. For courses whose subject includes programming, signal processing or other functionally expressed designs that operate on, or are used to produce media content, conventional techniques are also ill-suited. It has been discovered that media-rich, indeed even expressive, content can be accommodated as, or as derivatives of, coursework submissions using feature extraction and machine learning techniques. Accordingly, in on-line course offerings, even large numbers of students and student submissions may be accommodated in a scalable and uniform grading or scoring scheme. Instructors or curriculum designers may adaptively refine assignments or testing based on classifier feedback. Using developed techniques, it is possible to administer courses and automatically grade submitted work that takes the form of media encodings of
(Continued)

artistic expression, computer programming and even signal processing to be applied to media content.

33 Claims, 7 Drawing Sheets

Related U.S. Application Data

(60) Provisional application No. 61/860,375, filed on Jul. 31, 2013.

(51) Int. Cl.
*G06F 15/18* (2006.01)
*G06G 7/00* (2006.01)
*G06N 3/02* (2006.01)
*G06N 5/04* (2006.01)
*G06N 99/00* (2010.01)

(58) Field of Classification Search
USPC .......................................................... 706/15
See application file for complete search history.

(56) References Cited

U.S. PATENT DOCUMENTS

| | | | |
|---|---|---|---|
| 2009/0226872 A1* | 9/2009 | Gunther | G09B 7/00 434/350 |
| 2009/0286218 A1* | 11/2009 | Johnson | G09B 7/02 434/353 |
| 2010/0041007 A1* | 2/2010 | Wang | G09B 7/00 434/322 |
| 2010/0153109 A1* | 6/2010 | Du | G10L 25/78 704/243 |
| 2011/0004642 A1* | 1/2011 | Schnitzer | G06F 17/30743 700/94 |
| 2012/0233033 A1* | 9/2012 | Calman | G06Q 20/3227 705/27.1 |
| 2013/0156297 A1* | 6/2013 | Shotton | G06K 9/6255 382/159 |

OTHER PUBLICATIONS

'Rule of Thirds Detection from Photograph': Mai, 2011, IEEE, 978-0-7695-4589.*

* cited by examiner

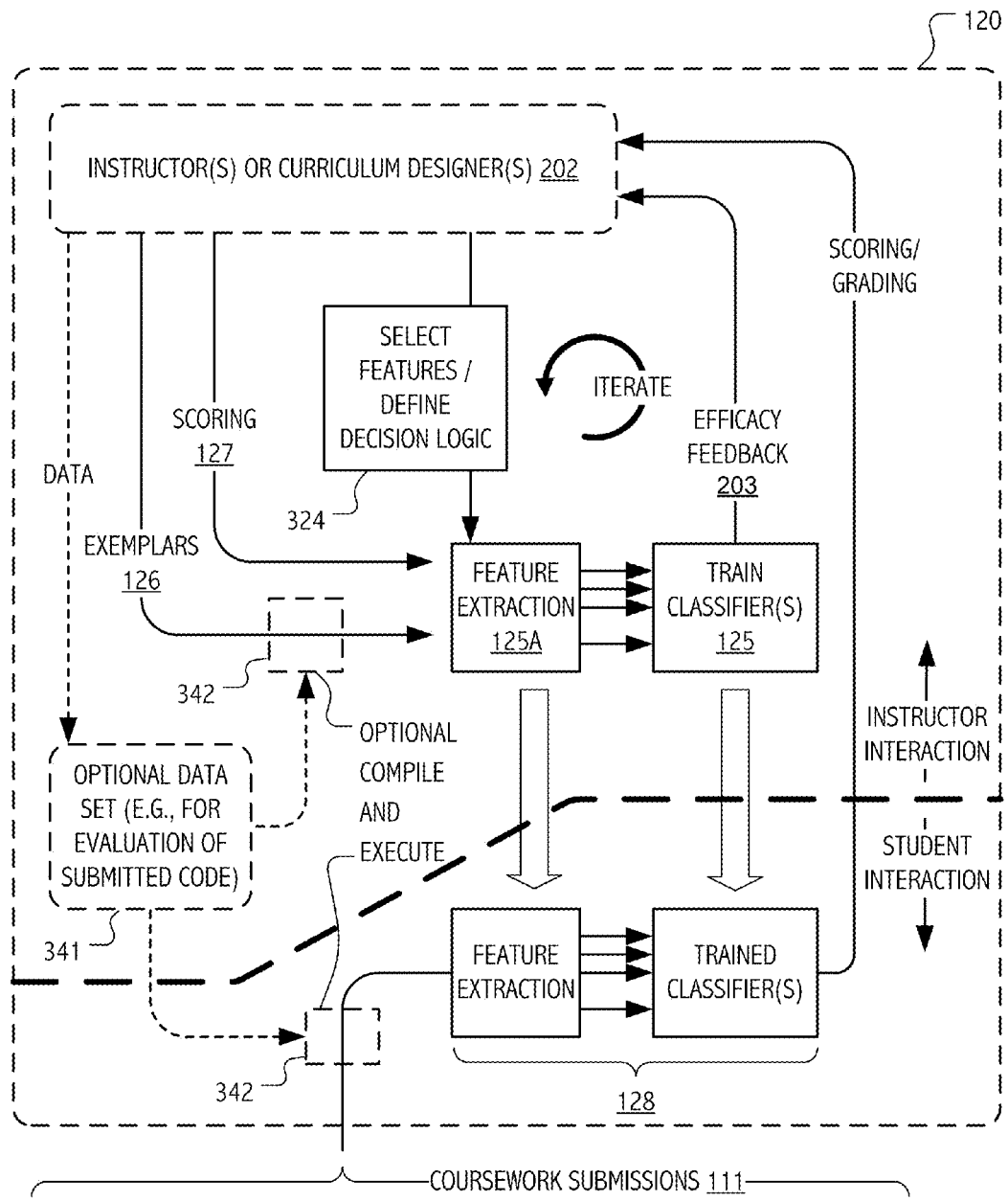
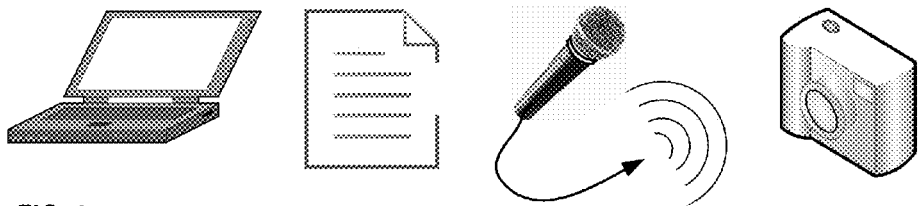
FIG. 3

FEATURE EXTRACTION AND MACHINE LEARNING FOR EVALUATION OF IMAGE- OR VIDEO-TYPE, MEDIA-RICH COURSEWORK

CROSS-REFERENCE TO RELATED APPLICATIONS

The present application is a continuation-in-part of U.S. application Ser. No. 14/448,579, filed Jul. 31, 2014, which (in turn) claims priority under 35 U.S.C. §119(e) of U.S. Provisional Application No. 61/860,375, filed Jul. 31, 2013. Each of the foregoing applications is incorporated herein by reference.

BACKGROUND

Field of the Invention

The present application is related to automated techniques for evaluating work product and, in particular, to techniques that employ feature extraction and machine learning to efficiently and consistently evaluate instances of media content that constitute, or are derived from, coursework submissions.

Description of the Related Art

As educational institutions seek to serve a broader range of students and student situations, on-line courses have become an increasingly important offering. Indeed, numerous instances of an increasingly popular genre of on-line courses, known as Massive Open Online Courses (MOOCs), are being created and offered by many universities, as diverse as Stanford, Princeton, Arizona State University, the Berkeley College of Music, and the California Institute for the Arts. These courses can attract hundreds of thousands of students each. In some cases, courses are offered free of charge. In some cases, new educational business models are being developed, including models in which students may be charged for deeper evaluation and/or credit, or in which advertising provides a revenue stream.

While some universities have created their own Learning Management Systems (LMS), a number of new companies have begun organizing and offering courses in partnership with universities or individuals. Examples of these include Coursera, Udacity, and edX. Still other companies, such as Moodle and Blackboard, offer LMS designs and services for universities who wish to offer their own courses.

Students taking on-line courses usually watch video lectures, engage in blog/chat interactions, and submit assignments, exercises, and exams. Submissions may be evaluated (to lesser or greater degrees, depending on the type of course and nature of the material), and feedback on quality of coursework submissions can be provided. While many courses are offered that evaluate submitted assignments and exercises, the nature and mechanics of the evaluations are generally of four basic types:

1) In some cases, human graders evaluate the exercises, assignments, and exams. This approach is labor intensive, scales poorly, can have consistency/fairness problems and, as a general proposition, is only practical for smaller online courses, or courses where the students are (or someone is) paying enough to hire and train the necessary number of experts to do the grading.

2) In some cases, assignments and exams are crafted in multiple-choice, true false, or fill-in-the blank style, such that grading by machine can be easily accomplished. In some cases, the grading can be instant and interactive, helping students learn as they are evaluated, and possibly shortening the exam time, e.g., by guiding students to harder/easier questions based on responses. However, many types of subject matter, particularly those in which artistic expression or authorship are involved, do not lend themselves to such assignment or examination formats.

3) In some cases, researchers have developed techniques by which essay-style assignments and/or exams may be scanned looking for keywords, structure, etc. Unfortunately, solutions of this type are, in general, highly dependent on the subject matter, the manner in which the tests/assignment are crafted, and how responses are bounded.

4) In some cases, peer-grading or assessment has been used, whereby a student is obligated to grade the work of N other students. Limitations of, and indeed complaints with, peer-assessment include lack of reliability, expertise and/or consistency. Additional issues include malicious or spiteful grading, general laziness of some students, drop-outs and the need to have students submit assignments at the same time, rather than at individual paces.

Improved techniques are desired, particularly techniques that are scalable to efficiently and consistently serve large student communities and techniques that may be employed in subject matter areas, such as artistic expression, creative content computer programming and even signal processing, that have not, to-date, proved to be particularly amenable to conventional machine grading techniques.

SUMMARY

For courses that deal with media content, such as sound, music, photographic images, hand sketches, video (including videos of dance, acting, and other performances, computer animations, music videos, and artistic video productions), conventional techniques for automatically evaluating and grading assignments are generally ill-suited to direct evaluation of coursework submitted in media-rich form. Likewise, for courses whose subject includes programming, signal processing or other functionally-expressed designs that operate on, or are used to produce media content, conventional techniques are also ill-suited. Instead, it has been discovered that media-rich, indeed even expressive, content can be accommodated as, or as derivatives of, coursework submissions using feature extraction and machine learning techniques. In this way, e.g., in on-line course offerings, even large numbers of students and student submissions may be accommodated in a scalable and uniform grading or scoring scheme. Instructors or curriculum designers may adaptively refine their assignments or testing based on classifier feedback. Using the developed techniques, it is possible to administer courses and automatically grade submitted work that takes the form of media encodings of artistic expression, computer programming and even signal processing to be applied to media content.

In some embodiments in accordance with the present invention(s), a method is provided for use in connection with automated evaluation of coursework submissions. The method includes receiving from an instructor or curriculum designer a selection of exemplary media content to be used in evaluating the coursework submissions. The exemplary media content includes a training set of examples each assigned at least one quality score by the instructor or curriculum designer. The method further includes accessing computer readable encodings of the exemplary media content that together constitute the training set and extracting from each instance of exemplary media content a first set of computationally defined features. The method includes, for each instance of exemplary media content, supplying a classifier with both the instructor or curriculum designer's assigned quality score and values for the computationally defined features extracted therefrom and, based on the supplied quality scores and extracted feature values, training the classifier, wherein the training includes updating internal states thereof. The method further includes accessing a computer readable encoding of media content that constitutes, or is derived from, the coursework submission and extracting therefrom a second set of computationally defined features, applying the trained classifier to the extracted second set of computationally defined features and, based thereon, assigning a particular quality score to the coursework submission.

In some cases or embodiments, plural additional classifiers are supplied with respective instructor or curriculum designer's assigned quality scores and values for computationally defined features extracted from respective instances of the exemplary media content. The additional classifiers are trained and applied as before. In some cases or embodiments, the quality score is, or is a component of, a grading scale for an assignment- or test question-type coursework submission.

In some cases or embodiments, the media content that constitutes, or is derived from, the coursework submission includes an image or video signal encoding and the method further includes (i) segmenting the image or video frame to define at least one region of interest, and (ii) extracting, for the segmented at least one region of interest, a particular computationally defined feature of the second set. In some cases or embodiments, the particular computationally defined feature characterizes either or both of (i) size or position of the region of interest relative to a rule of thirds alignment or point; and (ii) focus of, or within, the region of interest relative at least one other portion of the image or video frame. In some cases or embodiments, the segmenting provides foreground/background segmentation. In some cases or embodiments, the segmenting includes adaptively refined keypoint sets, wherein adaptive refinement is based on at least one of: iteration on the keypoint sets using automatically updated keypoint detection parameters; and computational clustering to refine the keypoint sets.

In some cases or embodiments, the coursework submission includes software code submitted in satisfaction of a programming assignment or test question, the software code executable to perform, or compilable to execute and perform, digital signal processing to produce output media content. The exemplary media content includes exemplary output media content produced using exemplary software codes, and the particular quality score assigned to the coursework submission is based on the applying of the classifier to the second set of computationally defined features extracted from the output media content produced by execution of the submitted software code.

In some cases or embodiments, the software code coursework submission is executable to perform digital signal processing on input media content to produce the output media content, and the exemplary output media content is produced from the input media content using the exemplary software codes. In some cases or embodiments, the output media content includes audio signals processed or rendered by the software code coursework submission.

In some cases or embodiments, the media content includes images or video processed or rendered by the software code coursework submission. In some cases or embodiments, the coursework submission includes a computer readable media encoding of expressive media content selected from the set of: sketches, paintings, photographic images or other artistic still visuals; and synchronized audio-visual content, computer animation or other video that is itself expressive or visually captures underlying expression such as dance, acting, or other performance.

In some cases or embodiments, the media content that constitutes, or is derived from, the coursework submission includes an audio signal encoding, and for the first and second sets, at least some of the computationally defined features are selected or derived from: a root mean square energy value; a number of zero crossings per frame; a spectral flux; a spectral centroid; a spectral roll-off measure; a spectral tilt; a mel-frequency cepstral coefficients (MFCC) representation of short-term power spectrum; a beat histogram; and/or a multi-pitch histogram computed over at least a portion of the audio signal encoding.

In some cases or embodiments, the media content that constitutes, or is derived from, the coursework submission includes an image or video signal encoding. For the first and second sets, at least some of the computationally defined features are selected or derived from: color histograms; two-dimensional transforms; edge, corner or ridge detections; curve or curvature features; a visual centroid; and/or optical flow computed over at least a portion of the image or video signal encoding.

In some cases or embodiments, the classifier implements an artificial neural network (NN), k-nearest neighbor (KNN), Gaussian mixture model (GMM), support vector machine (SVN) or other statistical classification technique.

In some embodiments, the method further includes iteratively refining the classifier training based on supply of successive instances of the exemplary media content to the classifier and updates to internal states thereof. In some embodiments the method further includes continuing the iterative refining until an error metric based on a current state of classifier training falls below a predetermined or instructor or curriculum designer-defined threshold.

In some cases or embodiments, the classifier is implemented using one or more logical binary decision trees, blackboard voting-type methods, or rule-based classification techniques.

In some embodiments the method further includes supplying the instructor or curriculum designer with an error metric based on a current state of classifier training. In some embodiments the method further includes supplying the instructor or curriculum designer with a coursework task recommendation based on a particular one or more of the computationally defined features that contribute most significantly to classifier performance against the training set of exemplary media content.

In some cases or embodiments, the first and second sets of computationally defined features are the same. In some cases or embodiments, the second set of computationally defined features includes a subset of the first set features selected based on contribution to classifier performance against the training set of exemplary media content. In some cases or embodiments, the quality score is, or is a component of a grading scale for an assignment- or test question-type coursework submission. In some embodiments, the method further includes receiving from the instructor or curriculum designer at least an initial definition of the first set of computationally defined features.

In some embodiments in accordance with the present invention(s), a computational system including one or more operative computers programmed to perform the method of any of foregoing methods. In some cases or embodiments, the computational system is itself embodied, at least in part, as a network deployed coursework submission system, whereby a large and scalable plurality (>50) of geographically dispersed students may individually submit their respective coursework submissions in the form of computer readable information encodings. In some cases or embodiments, the computational system includes a student authentication interface for associating a particular coursework submission with a particular one of the geographically dispersed students.

In some embodiments in accordance with the present invention(s), non-transient computer readable encoding of instructions executable on one or more operative computers to perform any of the foregoing methods.

In some embodiments in accordance with the present invention(s), a coursework management system for automated evaluation of coursework submissions includes an instructor or curriculum designer interface, a training subsystem and a coursework evaluation deployment of a trained classifier. The instructor or curriculum designer interface selects or receives exemplary media content to be used in evaluating the coursework submissions. The exemplary media content includes a training set of examples each assigned at least one quality score by the instructor or curriculum designer. The training subsystem is coupled and programmed to access computer readable encodings of the exemplary media content that together constitute the training set and to extracting from each instance of exemplary media content a first set of computationally defined features. The training subsystem is further programmed to, for each instance of exemplary media content, supply a classifier with both the instructor or curriculum designer's assigned quality score and values for the computationally defined features extracted therefrom, and to, based on the supplied quality scores and extracted feature values, train the classifier, wherein the training includes updating internal states thereof. The coursework evaluation deployment of the trained classifier is coupled and programmed to access a computer readable encoding of media content that constitutes, or is derived from, the coursework submissions and to extract therefrom a second set of computationally defined features. The coursework evaluation deployment applies the trained classifier to the extracted second set of computationally defined features and, based thereon, assigns a particular quality score to the coursework submission.

In some cases or embodiments, the training subsystem supplies plural additional classifiers with respective instructor or curriculum designer's assigned quality scores and values for computationally defined features extracted from respective instances of the exemplary media content and trains the additional classifiers. The coursework evaluation deployment also applies the trained additional classifiers.

In some cases or embodiments, the coursework management system further includes an execution environment. The coursework submission includes software code submitted in satisfaction of a programming assignment or test question. The software code is executable in the execution environment to perform, or compilable to execute in the execution environment and perform, digital signal processing to produce output media content. The exemplary media content includes the output media content produced using the submitted software code. The particular quality score assigned to the coursework submission is based on the applying of the classifier to the second set of computationally defined features extracted from the output media content produced using the submitted software code. In some cases or embodiments, the output media content includes audio signals processed or rendered by the software code coursework submission.

In some cases or embodiments, the classifier implements an artificial neural network (NN), k-nearest neighbor (KNN), Gaussian mixture model (GMM), support vector machine (SVN) or other statistical classification technique. In some cases or embodiments, the training subsystem allows the instructor or curriculum designer to iteratively refine the classifier training based on supply of successive instances of the exemplary media content to the classifier and updates to internal states thereof. In some cases or embodiments, the classifier is implemented using one or more logical binary decision trees, blackboard voting-type methods, or rule-based classification techniques.

In some embodiments in accordance with the present invention(s), a coursework management system includes means for selecting or receiving exemplary media content to be used in evaluating the coursework submissions, the exemplary media content including a training set of examples each assigned at least one quality score by the instructor or curriculum designer; means for extracting from each instance of exemplary media content a first set of computationally defined features, for supplying a classifier with both the instructor or curriculum designer's assigned quality score and values for the computationally defined features extracted therefrom and, based on the supplied quality scores and extracted feature values, for training the classifier; and means for extracting from the coursework submissions a second set of computationally defined features, for applying the trained classifier to the extracted second set of computationally defined features and, based thereon, for assigning a particular quality score to the coursework submission.

BRIEF DESCRIPTION OF THE DRAWINGS

The present invention may be better understood, and its numerous objects, features, and advantages made apparent to those skilled in the art by referencing the accompanying drawings.

FIG. 3 depicts both instructor-side and student-side portions of a feature extraction and machine learning system process flow for media-rich assignments or examinations in accordance with some embodiments of the present invention(s).

The use of the same reference symbols in different drawings indicates similar or identical items.

DESCRIPTION OF THE PREFERRED EMBODIMENT(S)

The computational techniques described herein address practical challenges associated with administration of educational courses or testing, including on-line courses offered for credit to large and geographically dispersed collections of students (e.g., over the Internet), using advanced feature extraction techniques combined with machine learning (ML) algorithms. The developed techniques are particularly well-suited to educational or testing domains in which assignments or test problems call for expressive content, such as sound, music, photographic images, hand sketches, video (including videos of dance, acting, and other performances, computer animations, music videos, and artistic video productions). The developed techniques are also well-suited to educational or testing domains in which assignments or test problems include programming, signal processing or other functionally expressed designs that operate on, or are used to produce media content, and which may be evaluated based on qualities of the media content itself. In each of the foregoing cases, conventional techniques for automatically evaluating and grading assignments (typically multiple choice, true/false or simple fill-in-the-blank or short answer questions) are ill-suited to the direct evaluation of coursework that takes on media-rich forms.

Instead, it has been discovered that media-rich, indeed even expressive, content can be accommodated as, or as derivatives of, coursework submissions using feature extraction and machine learning techniques. In this way, e.g., in on-line course offerings, even large numbers of students and student submissions may be accommodated in a scalable and uniform grading or scoring scheme. Instructors or curriculum designers are provided with facilities to adaptively refine their assignments or testing based on classifier feedback. Using the developed techniques, it is possible to administer courses and automatically grade submitted work that takes the form of media encodings of artistic expression, computer programming and even signal processing to be applied to media content.

Illustrative System(s) for Automated Coursework Evaluation

Figure 1:
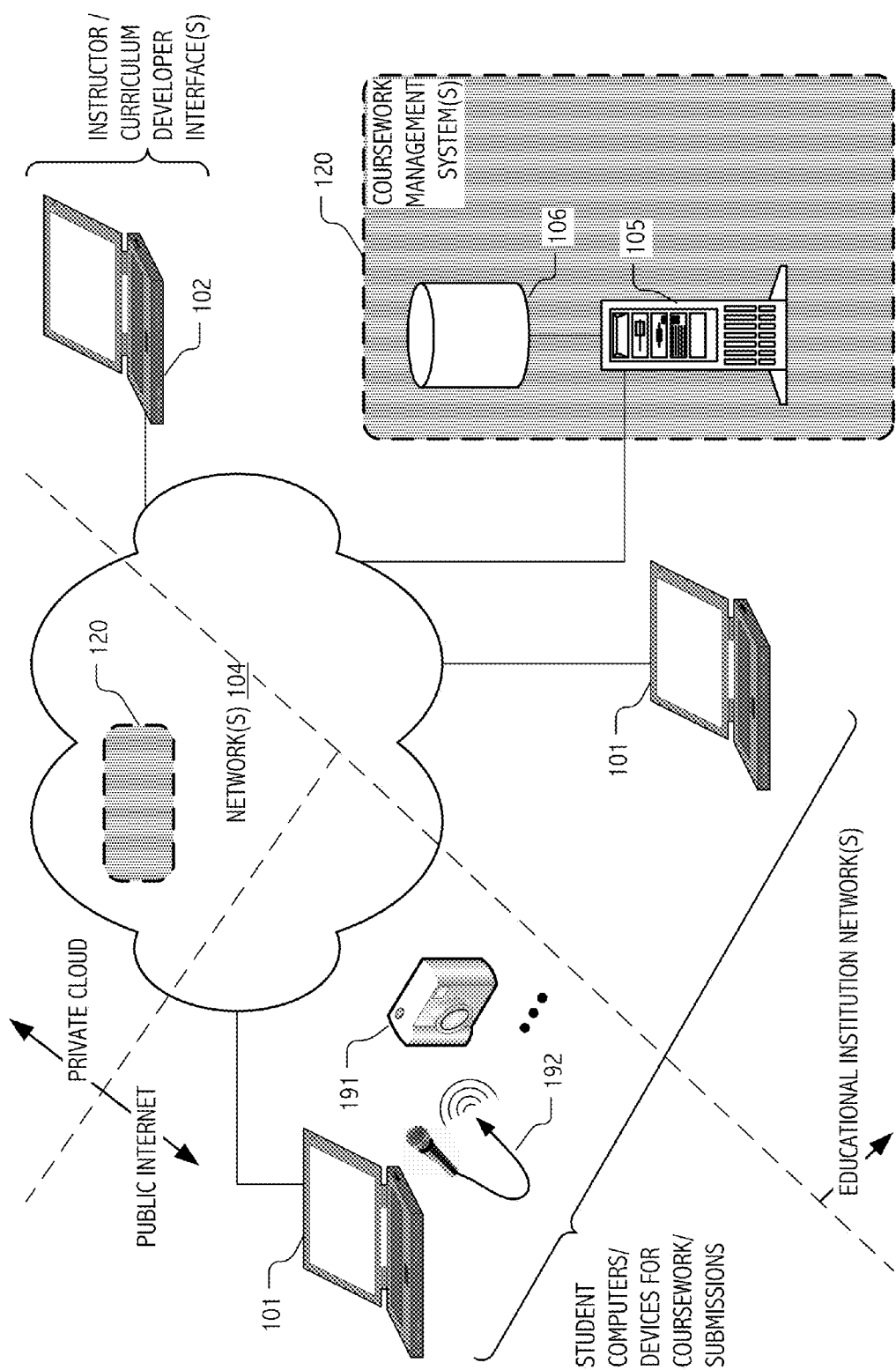
FIG. 1 depicts an illustrative networked information system in which students and instructors (and/or curriculum developers) interact with coursework management systems.

FIG. 1 depicts an illustrative networked information system in which students and instructors (and/or curriculum developers) interact with coursework management systems 120. In general, coursework management systems 120 such as described herein may be deployed (in whole or in part) as part of the information and media technology infrastructure (networks 104, servers 105, workstations 102, database systems 106, including e.g., audiovisual content creation, design and manipulation systems, code development environments, etc. hosted thereon) of an educational institution, testing service or provider, accreditation agency, etc. Coursework management systems 120 such as described herein may also be deployed (in whole or in part) in cloud-based or software-as-a-service (SaaS) form. Students interact with audiovisual content creation, design and manipulation systems, code development environments, etc. deployed (in whole or in part) on user workstations 101 and/or within the information and media technology infrastructure. In many cases, audiovisual performance and/or capture devices (e.g., still or motion picture cameras 191, microphones 192, 2D or 3D scanners, musical instruments, digitizers, etc.) may be coupled to or accessed by (or from) user workstations 101 in accordance with the subject matter of particular coursework and curricula.

In some cases, the audiovisual content created using such performance and/or capture devices constitutes, or forms a substantial component of, a student's coursework submission. For example, the coursework submission may include an encoding of an audio signal captured in connection with a vocal performance or a still image or motion video captured using a camera. Likewise, the coursework submission may include an encoding of an audio signal or image or video content synthesized or created in the first instance by the student using computer-based, media content creation, design and/or manipulation systems. In some cases, a student's coursework submission may constitute, or include, audiovisual content derived from some primary media content (e.g., one or more audio signals, image or video content, etc.) supplied as part of an assignment or test question. For example, a coursework submission might include an encoding of an audio signal that demonstrates the student's skill in mixing sources, equalizing, panning and/or compressing signals, etc. based on some basic audio encodings supplied as part of the assignment or test question. Likewise, a coursework submission might include encoding of an image or motion video that demonstrates the student's skill in placing, arranging or sizing subject matter elements in accordance with compositional figures of merit, performing color corrections, using or harmonizing colors, establishing mood by use or manipulation of hue, contrast or saturation, creating visual flow or managing scene changes.

Figure 2:
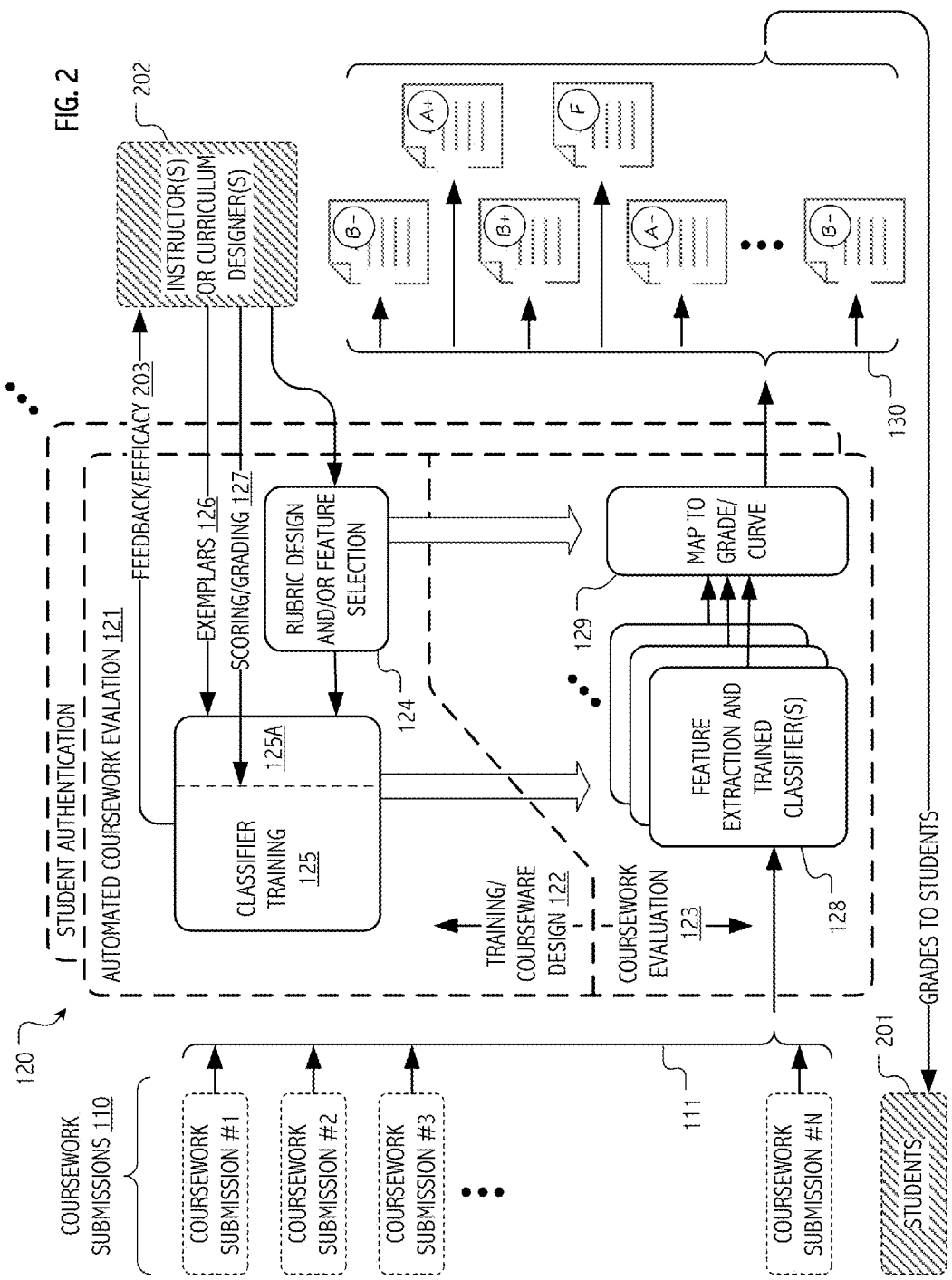
FIG. 2 depicts data flows, interactions with, and operational dependencies of, various components of a coursework management system that provides automated coursework evaluation in accordance with some embodiments of the present invention(s).

FIG. 2 depicts data flows, interactions with and operational dependencies of various components of an instance of coursework management system 120 that includes an automated coursework evaluation subsystem 121 in accordance with some embodiments of the present invention(s). In particular, automated coursework evaluation subsystem 121 includes a training/courseware design component 122 and a coursework evaluation component 123. An instructor and/or curriculum designer 202 interacts with the training/courseware design component 122 to establish (for given coursework such as a test, quiz, homework assignment, etc.) a grading rubric (124) and to select related computationally-defined features (124) that are to be used to characterize quality or scoring (e.g., in accordance with criteria and/or performance standards established in the rubric or ad hoc) for coursework submissions by students.

For example, in the context of an illustrative audio processing assignment, a rubric may define criteria including distribution of audio energy amongst selected audio sub-bands, degree or quality of equalization amongst sub-bands, degree of panning for mixed audio sources and/or degree or quality of signal compression achieved by audio processing. In the context of an illustrative image or video processing assignment, a rubric may define criteria for tonal or chromatic distributions, use of focus or depth of field, point of interest placement, visual flow and/or quality of image/video compression achieved by processing. Based on such rubrics, or in accord with ad hoc selections by instructor and/or curriculum designer 202, particular computationally-defined features are identified that will be extracted (typically) based on signal processing operations performed on media content (e.g., audio signals, images, video, digitized 3D surface contours or models, etc.) and used as input feature vectors in a computational system implementation of a classifier. Instructor and/or curriculum designer 202, also supplies (or selects) media content exemplars 126 and scoring/grading 127 thereof to be used in classifier training 125.

In general, any of a variety of classifiers may be employed in accordance with statistical classification and other machine learning techniques that exhibit acceptable performance in clustering or classifying given data sets. Suitable and exemplary classifiers are identified herein, but as a general proposition, in the art of machine learning and statistical methods, an algorithm that implements classification, especially in concrete and operative implementation, is commonly known as a "classifier." The term "classifier" is sometimes also used to colloquially refer to the mathematical function, implemented by a classification algorithm that maps input data to a category. For avoidance of doubt, a "classifier," as used herein, is a concrete implementation of statistical or other machine learning techniques, e.g., as one or more of code executable on one or more processors, circuitry, artificial neural systems, etc. (individually or in combination) that processes instances explanatory variable data (typically represented as feature vectors extracted from instances of data) and groups the instances into categories based on training sets of data for which category membership is known or assigned a priori.

In the terminology of machine learning, classification can be considered an instance of supervised learning, i.e., learning where a training set of correctly identified observations is available. A corresponding unsupervised procedure is known as clustering or cluster analysis, and typically involves grouping data into categories based on some measure of inherent statistical similarity uninformed by training (e.g., the distance between instances, considered as vectors in a multi-dimensional vector space). In the context of the presently claimed invention(s), classification is employed. Classifier training is based on instructor and/or curriculum designer inputs (exemplary media content and associated grading or scoring), feature vectors used characterize data sets are selected by the instructor or curriculum designer (and/or in some cases established as selectable within a training/courseware design module of an automated coursework evaluation system), and data sets are, or are derived from, coursework submissions of students.

Based on rubric design and/or feature selection 124 and classifier training 125 performed (in training/courseware design component 122) using instructor or curriculum designer 202 input, feature extraction techniques and trained classifiers 128 are deployed to coursework evaluation component 123. In some cases, a trained classifier is deployed for each element of an instructor or curriculum designer defined rubric. For example, in the audio processing example described above, trained classifiers may be deployed to map each of the following: (i) distribution of audio energy amongst selected audio sub-bands, (ii) degree or quality of equalization amongst sub-bands, (iii) degree of panning for mixed audio sources and (iv) degree or quality of signal compression achieved by audio processing to quality levels or scores based on training against audio signal exemplars. Likewise, in the image/video processing example described above, trained classifiers may be deployed to map each of the following: (i) distribution of tonal or chromatic values, (ii) focus or depth of field metrics, (iii) positioning or flow with a visual field of computationally discernible points/regions of interest and (iv) degree or quality of image/video compression to quality levels or scores based on training against image or video content exemplars. In some cases, features extracted from media-rich content 111 that constitutes, or is derived from, coursework submissions 110 by students 201 are used as inputs to multiple of the trained classifiers. In some cases, a single trained classifier may be employed, but more generally, outputs of multiple trained classifiers are mapped to a grade or score (129), often in accordance with curve specified by the instructor or curriculum designer.

Resulting grades or scores 130 are recorded for respective coursework submissions and supplied to students 201. Typically, coursework management system 120 includes some facility for authenticating students, and establishing, to some reasonable degree of certainty, that a particular coursework submission 110 is, in fact, submitted by the student who purports to submit it. Student authentication may be particularly important for course offered for credit or as a condition of licensure. While student authentication is not essential to all coursework management system implementations that provide automated coursework evaluation in accord with embodiments of the present invention(s), suitable student authentication techniques are detailed in commonly-owned, Provisional Application No. 62/000,522, filed May 19, 2014, entitled "MULTI-MODAL AUTHENTICATION METHODS AND SYSTEMS" and naming Cook, Kapur, Vallis and Hochenbaum as inventors, the entirety of which is incorporated herein by reference.

In some embodiments of coursework management system 120 (see e.g., FIG. 2), an automated coursework evaluation subsystem 121 may cooperate with student authentication facilities, such as fraud/plagiarism detection. For example, if coursework submissions (ostensibly from different, separately authenticated students) exhibit exactly or nearly the same score(s) based on extracted computationally defined features and classifications, then fraud or plagiarism is likely and can be noted or flagged for follow-up investigation. Likewise, if a coursework submission exhibits exactly the same score(s) (again based on extracted computationally defined features and classifications) as a grading exemplar or model audio signal, image, video or other expressive media content supplied to the students as an example, then it is likely that the coursework submission is, in-fact, a submission of the example, rather than the student's own work. Based on the description herein, persons of skill in the art will appreciate these and other benefits of integrating student authentication and automated coursework evaluation facilities in some embodiments of a coursework management system.

Exemplary Use Cases

The developed techniques provide instructors and curriculum designers with systems and facilities to add training examples together with grading or scoring characterizations thereof. For example, in some cases or embodiments, an instructor or curriculum designer 202 may identify certain training examples as exemplars (e.g., exemplars 126, see FIGS. 2, 3) of good and bad (or good, mediocre, and bad) coursework submissions that have been scored/graded (or that the instructor or curriculum designer may score/grade) 127. The system extracts (125A) computationally-defined features from the training examples, and uses these extracted features to train (125) a computational system that implements a classifier.

In general, an operative set of feature extractors may be interactively selected or defined (see rubric design/feature selection 124, FIG. 2 and select features/define decision logic 324, FIG. 3) for a particular assignment or test question. In some cases, systems or methods in accordance with the present inventions provide (and/or guide) the instructor or curriculum designer through a menu or hierarchy of feature extractor selections and/or classification stages. In some cases, a decision tree of rules may be automatically derivable from the provided files of good/bad examples. In some cases, it may be desirable to allow the instructor/curriculum designer to identify (or label) what is good or bad about the training examples. For example, in an application of the developed techniques to grading of music coursework submissions, systems and methods may allow the instructor/curriculum designer to note that a training example is (1) in the key of C, (2) has more than 2, but less than 10, discernible sections, (3) has a very strong beat, etc. In an application of the developed techniques to grading of image coursework submissions, systems and methods may allow the instructor/curriculum designer to note that a training example (1) places an in-focus foreground element in accordance with the rule of thirds, (2) employs a shallow depth of field, discernible sections, (3) uses hue, contrast and saturation in a manner that presents in a "film noir" style or mood.

The classifier learns to categorize submissions in accordance with the instructor or curriculum designer's classifications (e.g., on a grading scale or against a rubric), and (at least during training) provides the instructor or curriculum designer with feedback (203) as to how well (statistically speaking) submissions will be classified based on the current training. In some cases, the system makes suggestions as to how to change the task or criteria so that submissions are easier to classify and thus grade. In response, the instructor or curriculum designer can modify the assignment or evaluation criteria, resubmitting the original examples or modified ones, until they (and the system) are satisfied that the system will perform well enough for grading student submissions. As illustrated in FIG. 3, at least some embodiments of coursework management system 120, provide an iterative and interactive instructor (or curriculum designer) interaction to identify the set of computationally defined features and to train classifiers for deployment as an automated evaluator (see feature extraction and trained classifiers 128) of coursework submissions suitable for student interactions or use by a course administrator.

"Good" exemplars 126 (i) can come from historical or current masters in the field or can be examples that are representative of the style being emulated, (ii) can be generated by the curriculum designer or (iii) can include previous student submissions from prior administrations of the course (or even hand-picked grading exemplars from a current administration of the course). In some cases or educational domains, initial "bad" exemplars 126 can be provided by the curriculum designer or drawn from student submissions (whether from prior administrations or current exemplars). In some cases, once the system is used to offer a course or evaluate an assignment once, prior training (125) serves as a baseline and hand-selected student submissions are thereafter used to re-train the system, or refine the training, for better results.

Aside from speed and convenience, and the ability to evaluate thousands rather than tens of submissions in a short time can provide significant advantages. Furthermore, in some cases or embodiments, computational capabilities of the classifier may be scaled as needed, e.g., by purchasing additional compute power via cloud services or compute farms. Additional benefits include absolute objectivity and fairness. All assignments can be evaluated by exactly the same rules and trained machine settings. This is not the case with a collection of human examiners, who inevitably bring biases and grow fatigued during/between sessions, yielding inconsistent results.

Often, coursework submissions 111 are presented for automated evaluation as computer readable media encodings uploaded or directly selected by students from their respective workspaces. In some cases, a course administrator may act as an intermediary and present the coursework submissions 111 to the automated coursework evaluation subsystem 121. Suitable encoding formats are dependent on the particular media content domain to which techniques of the present invention are applied and are, in general, matters of design choice. Nonetheless, persons of skill in the art, having benefit of the present disclosure will appreciate use of suitable data access methods and/or codecs to obtain and present media content in data structural forms that are, in turn, suitable or convenient for feature extraction and use as classifier inputs in any particular implementation of the techniques described herein.

Media-Rich Grading Examples:

Persons of skill in the art having access to the present disclosure will appreciate a wide range of media-rich content for which the described automated grading techniques may be applied or adapted. Nonetheless, as a set of illustrative examples, we summarize computationally-defined features and mappings performed by a trained classifier first for several aspects of an audio processing course rubric and then for a music programming course rubric. Sets of computationally-defined audio features suitable to such courses are also summarized. Finally, we outline an application of similar techniques to media content characteristic of visual art, still images and/or motion video.

Audio Processing Course Example:

One illustrative example of a media-rich educational domain in which techniques of the present invention may be employed is audio processing, e.g., application of digital signal processing techniques to audio signal encodings. Depending on the course, operative implementations of such techniques may be made available to students in the form of audio processing systems, devices and/or software, or as an audio processing toolset, library, etc. Students may learn to use these operative implementations of signal processing techniques to manipulate and transform audio signals.

For example, in a basic audio processing course, students may be taught audio composition, sub-band equalization, mixing and panning techniques, use and introduction of reverberation, signal compression, etc. In such a course, students may be given assignments or quizzed or tested for mastery of these audio processing techniques. A coursework management system that provides automated evaluation of coursework submissions as described herein may facilitate administration of such a course. Accordingly, based on the description herein, persons of skill in the art will appreciate that systems and techniques detailed above with reference to FIGS. 2 and 3 may be employed or adapted to evaluate coursework submissions that seek to demonstrate student mastery of techniques for manipulating and transforming a reference audio signal. For such a course, a rubric may specify grading of one or more transformed audio signals for levels, equalization, panning and compression.

Grading for Levels and Equalization:

To facilitate grading for levels (and equalization), an instructor or curriculum designer may select or specify computational-defined features that include calculations of RMS power in a transformed audio signal submitted by the student and in various mix-motivated sub-bands thereof. For example, in some cases or situations, RMS power may be calculated in each of the following mix-motivated sub-bands for the submitted audio signal:

<40 Hz (sub)
40-120 Hz (bass)
120-400 Hz (low-mid)
400-900 Hz (mid)
0.9-2.5 kHz (high-mid)
2.5-6 kHz (presence)
6-10 kHz (bite)
>10 kHz (air/sibilance)

Using such computational-defined features and/or derived mean/variance measures, a classifier (or classifiers) may be trained using scored/graded reference signal exemplars to identify course work submissions that exhibit good, mediocre, and bad leveling from a compositional perspective. Likewise, a classifier (or classifiers) may be trained using scored/graded reference signal exemplars to identify course work submissions that exhibit good, mediocre, and bad equalization of sub-band levels. As will be appreciated, scoring quantization as good, mediocre, and bad is merely illustrative.

Grading for Panning:

To facilitate grading for panning, an instructor or curriculum designer may select or specify features that are computational-defined as follows:

1) Time-align student submitted audio signal with a reference audio signal and slice into beat-aligned segments.
2) Sum the energy in each segment in 24 bark-frequency bands, producing a beat-bark matrix.
3) Calculate channel similarity between Left and Right channels of submitted student audio signal as $$\psi(m, k) = \frac{|X_L(m, k) \cdot X_R^*(m, k)|}{|X_L(m, k)|^2 + |X_R(m, k)|^2}$$

(where m is bark index and k is beat index).
4) Calculate partial similarity measures for each channel as e.g.

$$\psi_L(m, k) = \frac{|X_L(m, k) \cdot X_R^*(m, k)|}{|X_L(m, k)|^2},$$

-continued $$\psi_R(m, k) = \frac{|X_R(m, k) \cdot X_L^*(m, k)|}{|X_R(m, k)|^2} \Psi_L(m, k) = \frac{|X_L(m,) \cdot X_R^*(m, k)|}{|X_L(m, k)|^2}$$

These partial similarities are then used to produce a sign function, i.e., −1 if $\psi_L$ (m, k)>$\psi_R$ (m, k) and +1 if vice versa.
5) Calculate a final panning index as 1−$\psi$(m, k) times the sign function.
6) Apply a logistic mask based on signal energy to panning index values to remove contribution from bins with little or no signal energy.
7) Calculate an overall panning score as the total absolute difference between student panning index and reference panning index over all beat-bark bins.

Using such computational-defined features, a classifier (or classifiers) may be trained using scored/graded reference signal exemplars to identify course work submissions that exhibit good, mediocre, and bad panning. As before, scoring quantization as good, mediocre, and bad is merely illustrative.

Grading for Compression:

To facilitate grading for compression, an instructor or curriculum designer may select or specify features that are computational-defined as follows:

1) Time-align student submitted audio signal with a reference audio signal.
2) Calculate time-domain amplitude envelope of submitted student file by low-pass filtering the squared amplitude (e.g., using a 512-order finite impulse response filter, 40 Hz cutoff, applied forward and then reverse), then taking the square root of half-wave rectified filtered signal.
3) Calculate a difference function between the envelope of the student submitted audio signal and the reference.
4) Compute the average zero-crossing rate, average absolute value, and average absolute first-order difference of the difference function.

Using such computational-defined features, a classifier (or classifiers) may be trained using scored/graded reference signal exemplars to identify course work submissions that exhibit good, mediocre, and bad compression. As before, scoring quantization as good, mediocre, and bad is merely illustrative.

Grading for Compositional Effort:

Still another example is grading for "compositional effort" (in essence, a computational-defined feature, decision-tree, and classifier-based evaluation of the question "is this music interesting?"). To evaluate compositional effort, we extract features, use them (plus clustering of windows) to segment the submitted audio into sections. Decision tree logic can determine whether the number, and indeed structure, of sections meets objectives specified in the grading rubric. In some cases, we can also compare sections pairwise using computationally-defined features to determine structure (e.g., verse, chorus, verse, chorus, bridge, chorus), and scoring or grading can be assigned based on such determined structure.

Video Processing Course Examples:

Another illustrative example of a media-rich educational domain in which techniques of the present invention may be employed is image or video processing, e.g., application of digital signal processing techniques to still image or motion video content. Depending on the course, operative implementations of such techniques may be made available to students in the form of image or video processing systems, devices and/or software, or as an image/video processing toolset, library, etc. Students may learn to use these operative implementations of signal processing techniques to manipulate and transform still image or motion video content.

Grading for Composition.

Figure 4:
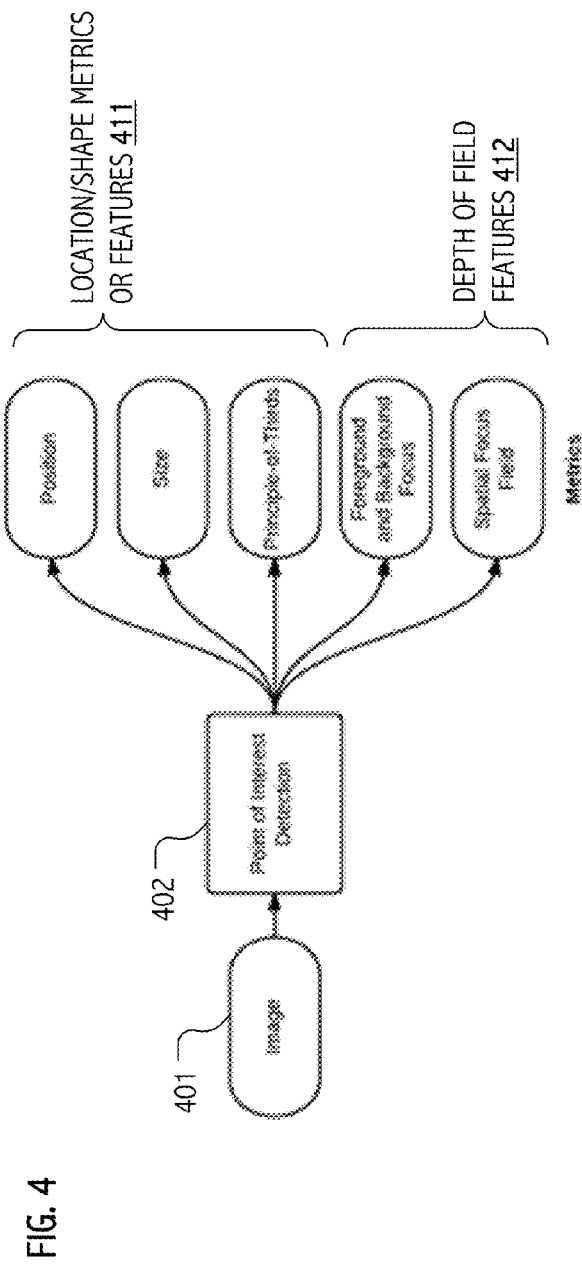
FIG. 4 is a flow diagram of a process in accordance with some embodiments of the present invention(s) by which certain computationally-defined features are extracted from an image or frame in motion video.

Composition generally describes an evaluation of the aesthetics of an arrangement of subject matter elements within a picture or image field. Automated techniques for grading for composition may therefore seek to computationally define and automate (in practical application) evaluations that embrace many of the core principles in photography, video, and other visual arts. In an effort to computationally assess certain illustrative aspects of composition in visual works, we have developed concrete computational mechanisms to automatically determine:

1. Foreground and Background
2. Center/point of interest within an image
3. Subject placement
4. Depth of field FIG. 4 illustrates a top-level flow of a process by which certain computationally-defined features are extracted from an image 401 (or analogously, from a frame in motion video). Based on operation of various mechanisms 402 for detecting points or regions of interest, certain location/shape metrics or features 411 and depth of field features 412 are computed (e.g., as part of the operation of feature extraction and trained classifiers 128, recall FIG. 2). Certain illustrative mechanisms 402 for detecting points or regions of interest are now detailed; however, based on the description herein, persons of skill in the art having benefit of the present disclosure will appreciate a wide variety of additional mechanism (and/or adaptations of mechanisms detailed herein) that may be utilized or incorporated in the context of automated coursework evaluation systems described herein.

Figure 5:
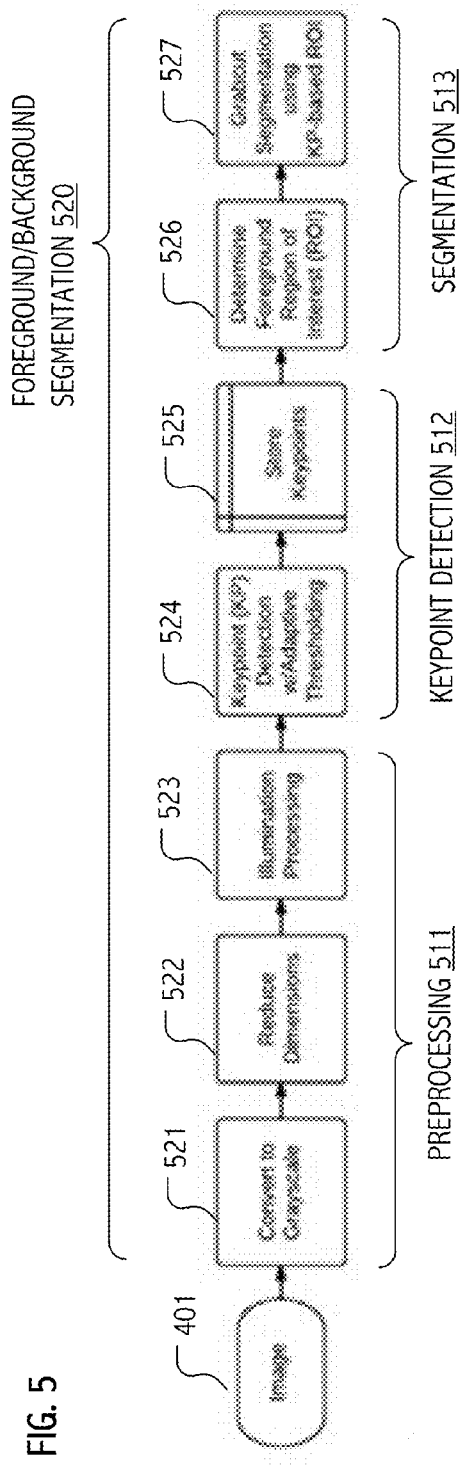
FIG. 5 is a flow diagram that illustrates successive computational steps performed in accordance with some embodiments of the present invention(s) to automatically segment foreground and background of an image.

Determining what is in the foreground and what is the background is an important initial element of other techniques such as the determinations of center/point/region of interest, depth of field, etc. described herein. FIG. 5 illustrates successive computational steps performed in furtherance of techniques that have been developed to automatically segment the foreground and background of an image. In particular, we begin with a preprocessing pipeline 511 which converts image 401 to grayscale (521), reducing its dimensions (522), and finally, an optional step of illumination processing (523). Good results, and specifically increased segmentation efficacy, have been achieved using Tan-Triggs illumination normalizing techniques as part of illumination processing 523.

After preprocessing (511), we perform keypoint detection (512) to identify a general area of interest in which we believe the foreground exists. Image keypoint detection is an active area of research in vision processing where images are decomposed into a sparse set of "features", called keypoints (KP), representing points of interest. An ideal keypoint detector finds salient image regions (strong groups of keypoints) and is invariant to image transformations such as translation, rotation, scaling, and affine deformation. In actual practice, a keypoint detector seeks to approach the ideal and exhibit at least substantial invariance to transformations typical in a particular image or video processing domain.

In some embodiments of automated coursework evaluation systems described herein, we run a keypoint detector adaptively to refine the set of keypoints returned. Currently, we use two different approaches for adaptive keypoint detection 524. The first approach is iterative, automatically updating its parameters so that we filter out extraneous keypoints. The second approach uses a clustering method (e.g., K-Means), to refine the keypoints returned and come up with a subset of keypoints containing the main foreground subject (largest cluster), or multiple subjects of interests (n clusters which contain x % of the total keypoints). Keypoints are stored (525) for use in the segmentation pipeline 513.

After detecting (524), extracting and storing (525) a set of keypoints, we computationally determine (526) a primary region of interest (ROI) containing the main subject/foreground of the image. A coding or identification of the primary region of interest is passed to a segmentation algorithm 527, which attempts to model the foreground in the KP-derived ROI provided, as well as the background (everything outside the KP-derived ROI). One example of a segmentation algorithm that we have found to be suitable in this context is the GrabCut algorithm described in Rother, Carsten, Vladimir Kolmogorov, and Andrew Blake. "*Grabcut: Interactive foreground extraction using iterated graph cuts.*" ACM Transactions on Graphics (TOG) 8 Aug. 2004: 309-314. In general, a segmentation technique such as that implemented in segmentation algorithm 527 can return a number of outputs, including masks which are used to derive the final area of the foreground, and the final background areas. When keypoint detection 524 is run using the clustering approach, and multiple keypoint cluster regions are detected, operations in the segmentation pipeline 513 run iteratively, allowing for multiple foreground subjects to be extracted from the rest of the image.

Figure 6:
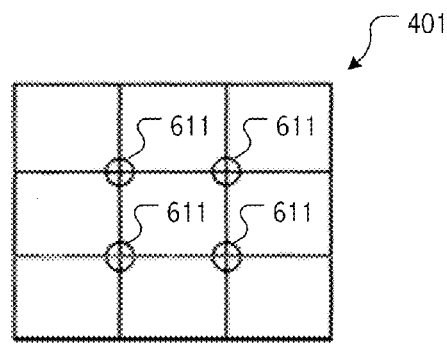
FIG. 6 depicts positions and regions in an image field consistent with a "rule of thirds" principle and as an illustration for understanding of related computational techniques described herein.

Building then on a foreground/background segmentation such as in accord with FIG. 5, many of the computationally-defined features or metrics introduced in FIG. 4 may now be extracted. Turning first to a center/point of interest and the "principle of thirds," when one principal subject or point of interest exists, it is generally appreciated that, as a matter of composition or aesthetics, center placement of principal subject or point of interest in the center of the visual field is not preferred, as it splits the picture in half, thus making it hard to balance. Accordingly, as illustrated in FIG. 6, the intersections 611 of lines that divide the picture area of image 401 into thirds are typically considered (as a matter of compositional analysis) to be better positions for the point of interest in most photographs and other visual compositions.

Figure 7:
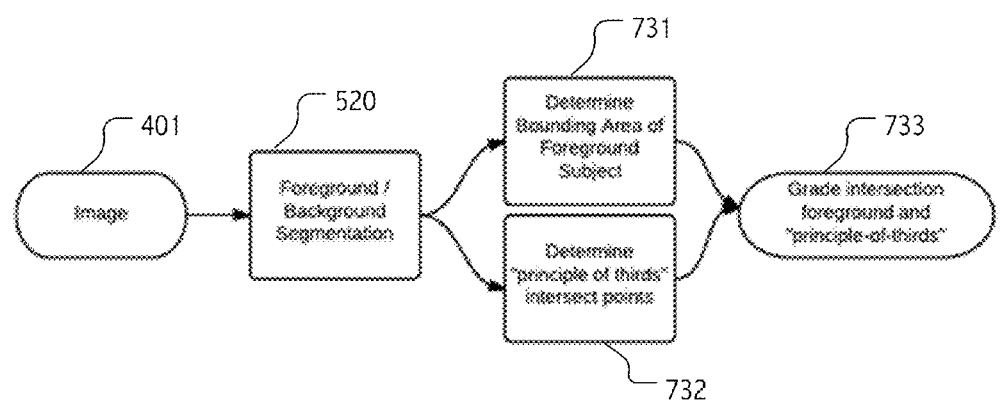
FIG. 7 is a flow diagram that illustrates automatic assessment, in accordance with some embodiments of the present invention(s), of whether a photo (or other visual work) adheres to a "rule of thirds" principle.
Figures 8A, 8B, 8C, 8D:
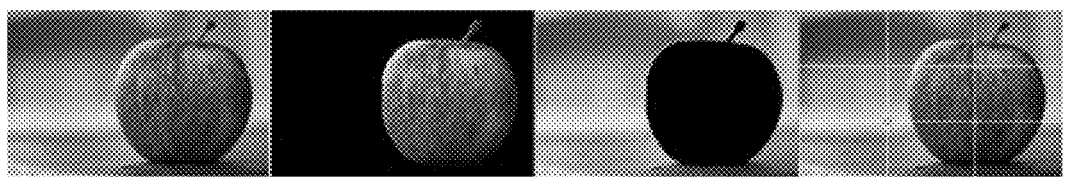
FIGS. 8A, 8B, 8C and 8D illustrate, by way of a set of images, a process in accordance with some embodiments of the present invention(s) by which an image (e.g., FIG. 8A) is segmented into foreground and background components (see FIGS. 8B and 8C) and by which a foreground region of interest is tested (see FIG. 8D) against a "rule of thirds" principle.

As depicted in FIG. 7, it is possible to automatically assess if a photo (or other visual work) adheres to the "principle of thirds." First, the foreground subject is extracted using the segmentation algorithm 520 described above with reference to FIG. 5. Next, the principle of thirds intersect points 611 (and corresponding image bisecting alignments) are calculated (731) by dividing the image into thirds along the x and y axes, and calculating positions. Then, a score is assigned (733) by determining (732) if the bounding area of the foreground subject(s) is/are non-center aligned and if the subject(s) intersect with the principle-of-thirds intersect points. A buffer area of some radius, or defining a cost function, around the principle-of-thirds intersect point can be used. The sequence of images in FIGS. 8A-8D illustrate this process, including segmenting original image (FIG. 8A) into foreground (FIG. 8B) and background (FIG. 8C) and testing against the "rule of thirds" principal (FIG. 8D).

Two additional location or shape metrics or features 411 that are graded automatically are the position and size of the foreground subject. This is achieved by first segmenting foreground subject or point/region of interest (e.g., using segmentation techniques 520, 402 described herein), and then determining the size/area and position of the foreground subject or point/region of interest within the image. These features or metrics can be compared to a reference image, and graded to see how closely the submitted image matches the composition of the reference image in terms of position and size. See generally, FIGS. 2, 3 and the accompanying description above.

In the context of film and photography, depth of field (DOF) is s distance between the nearest and farthest objects in a scene that appear acceptably sharp in an image. In some cases or for some compositions (and assignments), it may be desirable to have the entire image sharp, and a large DOF (or "deep focus") is appropriate. For other compositions or assignments, a small DOF (or "shallow focus"), may be more effective, emphasizing the subject while de-emphasizing the background, and sometimes parts of the foreground around the main subject.

Figure 9A:
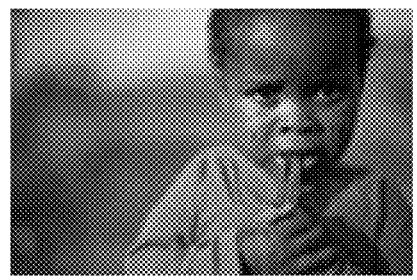
FIGS. 9A, 9B, 9C and 9D illustrate, using exemplary images, focus and/or depth of field characteristics pertinent to certain focus detection and segmentation techniques described herein and employed in accordance with some embodiments of the present invention(s).
Figure 9B:
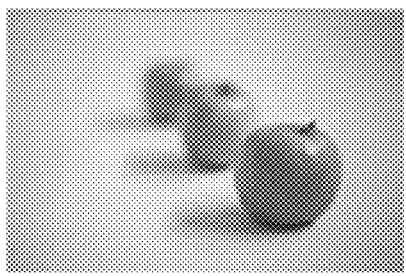
Figure 9C:
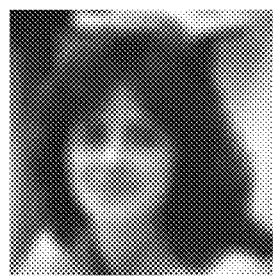
Figure 9D:

Understanding and using DOF is at the core of photographic, film, and other visuals works and is therefore an important aspect that would be desirable to address in a system that seeks to automatically evaluate coursework submissions. Take, for example, the child in the image of FIG. 9A. The subject (the child) is in focus while the background is completely out of focus—this is achieved using a shallow DOF, and the result makes the child the point of interest in the image. While a human may visually perceive and cognitively react to the use of focus, techniques described herein seek to enable a computational system to evaluate this aspect of composition. In contrast with the first image, another image (FIG. 9B) of the apples has a slightly less shallow DOF results in gradual decrease in focus over distance for an interesting visual effect. The woman in the third image (FIG. 9C) is out of focus completely (blurry), while the screenshot (FIG. 9D) from Citizen Kane uses deep focus to have the entire frame including all planes (mother at the front, father at the door, young Kane in the window) in focus. From these four examples, one can see how focus and DOF are used compositionally for many different effects, or even as a sign of poor imaging (as in the completely blurred image in FIG. 9C).

A variety of different measures for deducing focus in an image or part of an image will be appreciated by persons of skill in the art. One such measure that is employed in some embodiments of automated coursework evaluation systems described herein is a Cumulative Probability of Blur Detection (CPBD) algorithm such as described in Narvekar, Niranjan D, and Lina J. Karam. "*A no-reference image blur metric based on the cumulative probability of blur detection (CPBD).*" Image Processing, IEEE Transactions on 20.9 (2011): 2678-2683.

Figure 10:
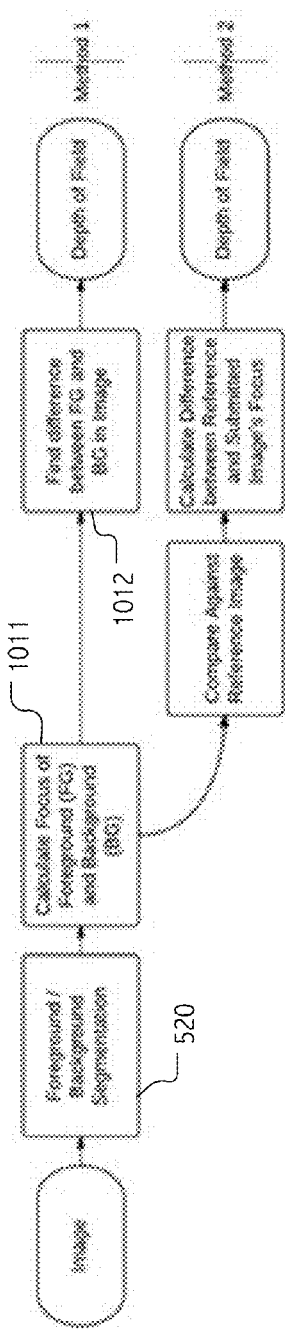
FIG. 10 is a flow diagram that illustrates computational techniques, in accordance with some embodiments of the present invention(s), for determining depth of field by comparing foreground and background focus measures or by comparison with a reference image.

One computational system approach determining and operating on depth of field, and for actually evaluating and grading image-based works, is to calculate (1011) a focus metric for both foreground and background segments and then compare (1012) the focus measure of the foreground subject to that for the background of the frame (see FIG. 10, method 1). By calculating the difference between the foreground subject's focus and the background, it is possible to determine if a shallow or deep DOF was used. This is especially useful in many photographic and video-based works, where shallow depth of field might be used as a compositional technique to make a subject pop out (as is often the case in portrait and still life photography), as exemplified by the images of FIG. 8A and FIG. 8B, or in the frame (FIG. 8D) from Citizen Kane where deep focus is used to provide multiple layers of complexity in the same image where the adults in the foreground are juxtaposed to young Kane in the background.

Figure 11:
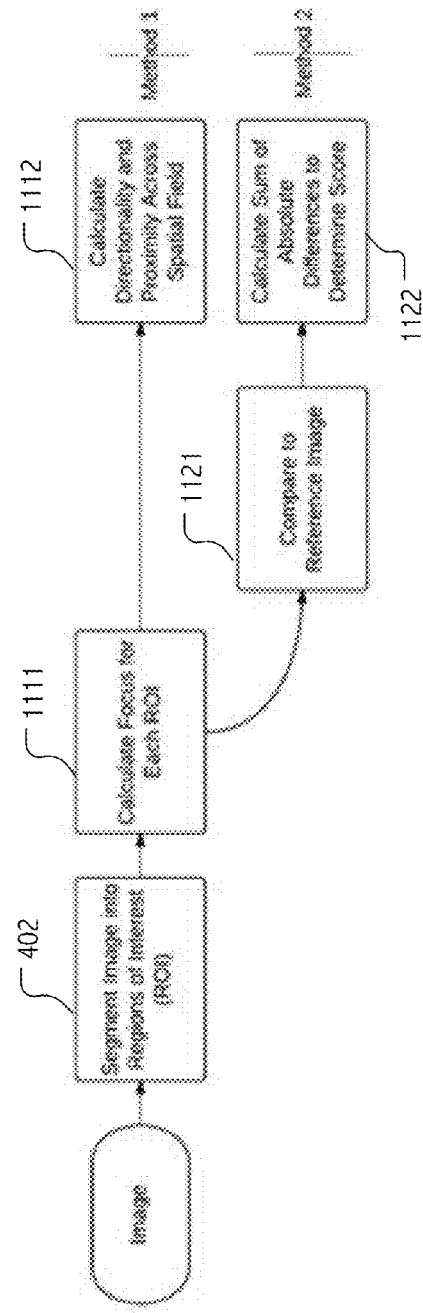
FIG. 11 is a flow diagram that illustrates computational techniques, in accordance with some embodiments of the present invention(s), for examining depth of field spatially to determine directionality or by grading against a reference image.

When depth of field (or more specifically, when a depth of field compositional aspect to be evaluated by an automated coursework evaluation systems) is in-between being fully shallow or fully deep (e.g., when lens aperture is between a largest and smallest setting), it may not be useful to compare the focus of the foreground to the background. For example, the focus for the apples in FIG. 8B (which is exhibits relatively shallow depth of field) gradually decreases over distance in the image. In such cases, it is possible to computationally characterize depth of field by splitting the image into regions of interest and calculating the focus measure over each region (see 1111, FIG. 11). This can be done along a particular axis, or along multiple axes. For example, by computationally characterizing the focus as one moves along the x- and y-axes, it is possible to determine that the image gradually increases in focus as we reach the final apple, up front, and at the right of the image, by comparing the focus measure from the left side toward the right. In fact, the apple is closest to the lens, and the apples to the left and behind gradually decrease in focus as they get further away from the camera. Using this information, it is possible to calculate directionality and proximity (1112) and to ultimately use these extracted features in classification. Likewise, the focus over each ROI can be compared to a reference image, and a grade assigned by taking the sum of the absolute differences (1122) between reference and submitted image (see FIG. 11, method 2). When a reference image is not used, the degree of DOF can be deduced by deducing the directionality and proximity from the focus map derived from calculating the focus over each ROI (see FIG. 11, method 1).

Next we provide examples of possible assignments which are "gradable" using the metrics and techniques described herein. Note that this section is not intended to be exhaustive of all possibilities or combinations of features or metrics, rather it provides an introduction to the ways in which the techniques presented can be used to automatically assess image, video, and other visual based works in the context of education environments and automated coursework evaluation systems.

Image Assignment: General Composition.

For this assignment a student is instructed to adhere to the basic principles of composition taught in the course (focus/sharpness, principle-of-thirds, depth-of-field). The submitted works are assessed using techniques described herein (and a score assigned) for any combination of the following criteria:

1. Overall focus (is the image in focus overall or is it blurry/out of focus)
2. Is there a defined point-of-interest(s) in the image
3. Does the image adhere to the principle-of-thirds Alternatively, the assignment can include a reference image in which the student needs to analyze and recreate, compositionally. Note, this does not mean the subject and scene need to be the same—rather the size and placement (including principle-of-thirds) of the foreground subject(s), and depth of field can be analyzed in the reference image, and compared to the same metrics determined in the submitted work. A score can be assigned by how closely the student matched the reference work.

Image Assignment: Portrait Photography.

As exemplified with the boy in the image FIG. 8A, portrait photography often uses a shallow focus to highlight the person in the image while blurring the background. In this more domain specific example, this technique can be automatically assessed using the segmentation algorithm detailed earlier, and by either examining the difference between the foreground subject's (individual) and background's (scene) focus measures (larger difference would yield a higher score), or by looking at the difference between the submitted work's foreground and a reference work's foreground, and the submitted work's background focus and a reference work's background focus (and by assigning a score based on how closely they match).

Video Assignment: Depth-of-Field & Manual Focus Effect/Transition.

In the evaluation of this assignment, previously described techniques for segmentation and extraction of depth-of-field features or metrics are used in combination with either scene-change detection or frame-by-frame analysis to analyze video/film works. For example, the student can be instructed to utilize a shallow focused shot (like the shot of the boy in FIG. 8A or the apples in FIG. 8B) in one scene with a deep focus shot in another (exemplified by the frame from Citizen Kane in FIG. 8D). In combination with techniques determining the location of scene changes, the depth of field between scenes can be determined and a score given. Additionally, utilizing frame-by-frame analysis enables not only the detection/presence of these techniques or transitions, but also their location and durations—any of which can be parameterized in an assignment and combined to assign an overall score or grade.

Grading for Color and Contrast.

Color and Contrast are used heavily in photography, video, and the visual arts, for artistic and stylistic reasons, and also correctional reasons (e.g. color correcting images/film for consistency, enhancing depth or vibrance). In addition to composition aspects of visual works, we are able to analyze images and other visual works in a number of ways. Some of the features we are able to computationally define and use in automated coursework evaluation include:

1. Contrast Measure
2. Saturation Levels
3. Average Brightness
4. Average Hue
5. Color/Grayscale Image Histogram—"An image histogram is a type of histogram that acts as a graphical representation of the tonal distribution in a digital image. It plots the number of pixels for each tonal value. By looking at the histogram for a specific image a viewer will be able to judge the entire tonal distribution at a glance."
6. Color Quantization—Color Quantization can be a useful tool to help simplify color content of an image for further color analysis or image processing. Quantization reduces the number of colors in an image. In the following example a K-Means Clustering algorithm is used.

Using the features or metrics described above, a number of scores can be assigned to a student's work, and automatic feedback responses can be generated. In this section we present selected examples of a few automatically gradable metrics:

Color Theory: Color quantization and color histograms can be used to determine the dominant colors present in the image or frame, which can be tested to see if they adhere to the basic principles of color theory, i.e., color harmony, complimentary, warm vs. cool, etc. Color theory is at the core of many visual based mediums, and as such, this type of color analysis is extremely useful in the context of photography, video, painting, graphic design, and other visual arts.

Mood: Different "moods" can be linked to (or mapped, in the feature extraction, classification and mapping sense of our automated coursework evaluation techniques, from) different hues, contrast, and saturation. In assignments where students are asked to recreate the look-and-feel of reference works (for example, certain periods in time/history, darker, warm vs. cool), computationally evaluating the image histogram, average hue, average contrast, and average saturation, can yield a score/grade in relation to how closely the student matched the look and feel of the reference source or "style" (e.g., film noir).

Color Correction. The technique of color correction is an important skill in digital photography and video editing and, as a result, is an expressive aspect that we seek to evaluate in coursework submissions using computational techniques described herein. In an assignment, a student could be given an uncorrected image and told to match a corrected version to the best of their ability. Their coursework submission can then be graded against the reference image by comparing the color histograms, overall contrast, and saturation values. A score or grade is derived based on how close their corrections matched the reference image and feedback.

Grading of Music Programming:

A related, and also illustrative, example of a media-rich educational domain in which techniques of the present invention may be employed is music programming, i.e., digital signal processing software as applied to audio encodings of music. In a music programming course, students may be given an assignment to develop a computer program to perform some desired form of audio processing on an audio signal encoding. For example, a student might be assigned the task of developing programming to reduce the dynamic range of an existing audio track (called compression) by computing a running average of the RMS power in the signal, then applying a dynamically varying gain to the signal in order to make louder segments softer, and softer segments louder, thus limiting the total dynamic range.

In support of such an assignment, the systems and methods described herein may perform an initial textual and structural evaluation of the students' submitted coursework (here, computer code). Using lexical and/or syntactic analysis, it is possible to determine conformance with various elements required by the assignment, e.g., use of calling structures and required interfaces, use of particular computational primitives or techniques per the assignment, coding within storage use constraints, etc. Next, the systems and methods may compile the submitted code automatically (e.g., to see if it compiles; if not, the student must re-submit). Once compiled, the coursework submission may be executed against a data set to process audio input and/or generate audio output. Alternatively or in addition, the student's submission itself may include results (e.g., an encoded audio signal) generated by execution of the coursework submission against a data set to process audio input and/or generate audio output. In either case, the audio features are extracted from the audio signal output and supplied to the classifiers of the machine-grading system to produce a grading or score for the coursework submission. See e.g., FIG. 3 and the optional data set 341 (for evaluation of submitted code) and optional compile and executed operations 342 illustrated therein.

Predefined Feature Extractors and Exemplary Classifier Designs:

Although the selection of particular audio features to extracted may be, in general, assignment- or implementation-dependent (and in some cases or embodiments may be augmented or extended with instructor- or curriculum-defined feature extraction modules), an exemplary set of audio feature extraction modules may be provided for selection by the instructor or curriculum designer. For example, in some cases or embodiments, the following computationally-defined feature extractions may be provided or selected with computations over windows of various size (20, 50, 100 ms, 0.5 s, typical):

RMS (Root Mean Square) energy of the audio signal;
Number of zero crossings (per frame) in the audio signal;
Spectral flux (frame to frame difference of power spectra, e.g., FFT magnitude) of the audio signal;
Spectral centroid (center of gravity of power spectrum, brightness measure) of the audio signal;
Spectral roll-off frequency for the audio signal (below this freq., X % of total power spectrum energy lies);
Spectral tilt of the audio signal (slope of line fit to power spectrum or log power spectrum);
mel-frequency cepstral coefficients (MFCC) representation of short-term power spectrum for the audio signal (inverse transform of log of power spectrum, warped to Mel freq. scale);
Beat histogram for the audio signal (non-linear autocorrelation-based estimates of music/sonic pulse); and/or
Multi-pitch histograms for the audio signal (extract sinusoids, cluster by harmonicity, calculate pitches).

In general, means and standard deviations of these and/or or other extracted features are computed (often over different windows) and used to characterize sound and music. In some cases, signals may be segmented, and features computationally extracted over contextually-specific segments. Using various metrics, distance functions, and systems, including artificial neural network (NN), k-nearest neighbor (KNN), Gaussian mixture model (GMM), support vector machine (SVN) and/or other statistical classification techniques, sounds/songs/segments can be compared to others from a previously scored or graded database of training examples. By classifying coursework submissions against a computational representation of the scored or graded training examples, individual coursework submissions are assigned a grade or score. In some case or embodiments, features (or feature sets) can be compressed to yield "fingerprints," making search/comparison faster and more efficient. Based on the description herein, persons of ordinary skill in the art will appreciate both a wide variety of computationally-defined features that may be extracted from the audio signal of, or derived from, a coursework submission and a wide variety of computational techniques for classifying such coursework submissions based on the extracted features.

Turning illustratively to visual art, images and/or video, it will be appreciated that it is possible to compute features from still images, or from a succession of images (video) using similar or at least analogous techniques applied generally as described above. Techniques in this sub-domain of signal processing are commonly referred to as "computer vision" and, as will be appreciated by persons of ordinary skill in these arts having benefit of the present disclosure, analogous features for extraction can include color histograms, 2D Transforms, edges/corners/ridges, curves and curvature, blobs, centroids, optical-flow, etc. In video targeted applications, detection of sections and transitions (fades, cuts, dissolves, etc.) may be used in automated grading, particularly where a rubric asks students to use at least one each of jump-cut, fade, cross-dissolve, or to have at least three separate "scenes". As with the audio processing examples above, decision tree logic and computationally-defined features may be employed to detect sections and transitions (here, fades, cuts, dissolves, etc.) between sections. If statistics for sections differ, grading/scoring can be based on the presence, character or structure of the sections or transitions and correspondence with the rubric.

As before, means and standard deviations of these and/or or other extracted features are computed (often over different windows) and used to characterize the images or video. Again, extracted feature sets may be used to classify coursework submissions against a graded or scored set of exemplars. Using various metrics, distance functions, and systems, including artificial neural network (NN), k-nearest neighbor (KNN), Gaussian mixture model (GMM), support vector machine (SVN) and/or other statistical classification techniques, images/video segments can be compared to others from a previously scored or graded database of training examples. By classifying coursework submissions against a computational representation of the scored or graded training examples, individual coursework submissions are assigned a grade or score.

Other Embodiments and Variations

While the invention(s) is (are) described with reference to various embodiments, it will be understood that these embodiments are illustrative and that the scope of the invention(s) is not limited to them. Many variations, modifications, additions, and improvements are possible. For example, while certain illustrative signal processing and machine learning techniques have been described in the context of certain illustrative media-rich coursework and curricula, persons of ordinary skill in the art having benefit of the present disclosure will recognize that it is straightforward to modify the described techniques to accommodate other signal processing and machine learning techniques, other forms of media-rich coursework and/or other curricula.

Both instructor-side and student-side portions of a feature extraction and machine learning system process flows for media-rich coursework have been described herein in accordance with some embodiments of the present invention(s). In simplified, yet illustrative use cases chosen to provide descriptive context, the instructor or curriculum designer provides a set of exemplars that she scores, classifies or labels as "good" and provides set of exemplars that she scores, classifies or labels as "bad." The instructor or curriculum, then trains the illustrated computational machine by selecting/pairing features or expressing rules or other decision logic, as needed, to computationally classify the exemplars (and subsequent coursework submissions) in accord with the desired classifications. As will be appreciated by persons of ordinary skill in the art having benefit of the present disclosure, scores, classes or labels of interest may be multi-level, multi-variate, and/or include less crass or facially apparent categorizations. For example, classifiers may be trained to classify in accordance with instructor or curriculum provided scores (e.g., ratings from 0 to 6 on each of several factors, on a 100-point scale or, in some cases, as composite letter grades) or labels (e.g., expert/intermediate/amateur), etc.

Furthermore, as online courses become more popular and are offered for credit, a further concern arises related to verification and authentication of the student taking the course and submitting assignments. Cases of fraud, e.g., where someone is hired to do the work for someone else who will receive credit, must be avoided if possible. Some institutions who offer online for credit require physical attendance at proctored examinations. As online courses expand to offer credit in geographically diverse locations, and as class sizes grow, supervised exams can become impractical or impossible. The techniques implemented by systems described herein can help with this problem, using the same or similar underlying frameworks for voice, face, and gesture recognition. If required, the user can be required to authenticate themself, e.g., via Webcam, with each assignment submission, or a number of times throughout an online exam. In some cases or embodiments, a student authentication may use the same or similar features used to grade assignments to help determine or confirm identity of the coursework submitter For example, in some cases or embodiments, computationally-defined features extracted from audio and/or video provided in response to a "Say your name into the microphone" direction or a "Turn on your webcam, place your face in the box, and say your name" requirement may be sufficient to reliably establish (or confirm) identity of an individual taking a final exam based, at least in part, on data from earlier coursework submissions or enrollment.

Embodiments in accordance with the present invention(s) may take the form of, and/or be provided as, a computer program product encoded in a machine-readable medium as instruction sequences and other functional constructs of software, which may in turn be executed in a computational system to perform methods described herein. In general, a machine readable medium can include tangible articles that encode information in a form (e.g., as applications, source or object code, functionally descriptive information, etc.) readable by a machine (e.g., a computer, server, virtualized compute platform or computational facilities of a mobile device or portable computing device, etc.) as well as non-transitory storage incident to transmission of the information. A machine-readable medium may include, but is not limited to, magnetic storage medium (e.g., disks and/or tape storage); optical storage medium (e.g., CD-ROM, DVD, etc.); magneto-optical storage medium; read only memory (ROM); random access memory (RAM); erasable programmable memory (e.g., EPROM and EEPROM); flash memory; or other types of medium suitable for storing electronic instructions, operation sequences, functionally descriptive information encodings, etc.

In general, plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method for use in connection with automated evaluation of coursework submissions, the method comprising:
receiving from an instructor or curriculum designer a selection of exemplary media content to be used in evaluating the coursework submissions, the exemplary media content including a training set of examples each assigned at least one quality score by the instructor or curriculum designer;
accessing computer readable encodings of the exemplary media content that together constitute the training set and extracting from each instance of exemplary media content a first set of computationally defined features;
for each instance of exemplary media content, supplying a classifier with both the instructor or curriculum designer's assigned quality score and values for the computationally defined features extracted therefrom;
based on the supplied quality scores and extracted feature values, training the classifier, wherein the training includes updating internal states thereof;
accessing a computer readable encoding of media content that constitutes, or is derived from, the coursework submission, wherein the computer readable encoding of media content includes an image or video frame processed or rendered by software code included in the coursework submission;
segmenting the image or video frame to define at least one region of interest;
extracting, from the computer readable encoding of media content, a second set of computationally defined features, wherein a particular computationally defined feature of the second set is extracted from the segmented at least one region of interest; and
applying the trained classifier to the extracted second set of computationally defined features and, based thereon, assigning a particular quality score to the coursework submission.

2. A method as in claim 1, further comprising:
supplying plural additional classifiers with respective instructor or curriculum designer's assigned quality scores and values for computationally defined features extracted from respective instances of the exemplary media content;
training the additional classifiers; and
applying the trained additional classifiers.

3. A method as in claim 1,
wherein the quality score is, or is a component of, a grading scale for an assignment- or test question-type coursework submission.

4. A method as in claim 1, wherein the particular computationally defined feature characterizes one of:
size or position of the region of interest relative to a rule of thirds alignment or point; and
focus of, or within, the region of interest relative at least one other portion of the image or video frame.

5. A method as in claim 1, wherein the segmenting provides foreground/background segmentation.

6. A method as in claim 1, wherein the segmenting includes adaptively refined keypoint sets, wherein adaptive refinement is based on at least one of:
iteration on the keypoint sets using automatically updated keypoint detection parameters; and
computational clustering to refine the keypoint sets.

7. A method as in claim 1,
wherein the software code is submitted in satisfaction of a programming assignment or test question, the software code executable to perform, or compilable to execute and perform, digital signal processing to produce output media content;
wherein the exemplary media content includes exemplary output media content produced using exemplary software codes; and
wherein the particular quality score assigned to the coursework submission is based on the applying of the classifier to the second set of computationally defined features extracted from the output media content produced by execution of the submitted software code.

8. A method as in claim 7,
wherein the software code coursework submission is executable to perform digital signal processing on input media content to produce the output media content; and
wherein the exemplary output media content is produced from the input media content using the exemplary software codes.

9. A method as in claim 1, wherein the coursework submission includes a computer readable media encoding of expressive media content selected from the set of:
sketches, paintings, photographic images or other artistic still visuals; and
synchronized audiovisual content, computer animation or other video that is itself expressive or visually captures underlying expression such as dance, acting, or other performance.

10. A method as in claim 1,
wherein the media content that constitutes, or is derived from, the coursework submission includes an audio signal encoding; and
wherein for the first and second sets, at least some of the computationally defined features are selected or derived from:
a root mean square energy value;
a number of zero crossings per frame;
a spectral flux;
a spectral centroid;
a spectral roll-off measure;
a spectral tilt;
a mel-frequency cepstral coefficients (MFCC) representation of short-term power spectrum;
a beat histogram; and/or
a multi-pitch histogram
computed over at least a portion of the audio signal encoding.

11. A method as in claim 1,
wherein for the first and second sets, at least some of the computationally defined features are selected or derived from:
color histograms;
two-dimensional transforms;
edge, corner or ridge detections;
curve or curvature features;
a visual centroid; and/or
optical flow
computed over at least a portion of the image or video frame.

12. A method as in claim 1,
wherein the classifier implements an artificial neural network (NN), k-nearest neighbor (KNN), Gaussian mixture model (GMM), support vector machine (SVN) or other statistical classification technique.

13. A method as in claim 1, further comprising:
iteratively refining the classifier training based on supply of successive instances of the exemplary media content to the classifier and updates to internal states thereof.

14. A method as in claim 13, further comprising:
continuing the iterative refining until an error metric based on a current state of classifier training falls below a predetermined or instructor or curriculum designer-defined threshold.

15. A method as in claim 1,
wherein the classifier is implemented using one or more logical binary decision trees, blackboard voting-type methods, or rule-based classification techniques.

16. A method as in claim 1, further comprising:
supplying the instructor or curriculum designer with an error metric based on a current state of classifier training.

17. A method as in claim 1, further comprising:
supplying the instructor or curriculum designer with a coursework task recommendation based on a particular one or more of the computationally defined features that contribute most significantly to classifier performance against the training set of exemplary media content.

18. A method as in claim 1,
wherein the first and second sets of computationally defined features are the same.

19. A method as in claim 1,
wherein the second set of computationally defined features includes a subset of the first set features selected based on contribution to classifier performance against the training set of exemplary media content.

20. A method as in claim 1,
wherein the quality score is, or is a component of a grading scale for an assignment- or test question-type coursework submission.

21. A method as in claim 1, further comprising:
receiving from the instructor or curriculum designer at least an initial definition of the first set of computationally defined features.

22. A computational system including one or more operative computers programmed to perform the method of claim 1.

23. The computational system of claim 22 embodied, at least in part, as a network deployed coursework submission system, whereby a large and scalable plurality (>50) of geographically dispersed students may individually submit their respective coursework submissions in the form of computer readable information encodings.

24. The computational system of claim 23 including a student authentication interface for associating a particular coursework submission with a particular one of the geographically dispersed students.

25. A non-transient computer readable encoding of instructions executable on one or more operative computers to perform the method of claim 1.

26. A coursework management system for automated evaluation of coursework submissions, the system comprising:
an instructor or curriculum designer interface for selecting or receiving exemplary media content to be used in evaluating the coursework submissions, the exemplary media content including a training set of examples each assigned at least one quality score by the instructor or curriculum designer;
a training subsystem coupled and programmed to access computer readable encodings of the exemplary media content that together constitute the training set and to extracting from each instance of exemplary media content a first set of computationally defined features;
the training subsystem further programmed to, for each instance of exemplary media content, supply a classifier with both the instructor or curriculum designer's assigned quality score and values for the computationally defined features extracted therefrom, and to, based on the supplied quality scores and extracted feature values, train the classifier, wherein the training includes updating internal states thereof; and
a coursework evaluation deployment of the trained classifier coupled and programmed to access a computer readable encoding of media content that constitutes, or is derived from, the coursework submissions and to extract therefrom a second set of computationally defined features, wherein the media content that constitutes, or is derived from, the coursework submission includes an image or video frame;

wherein the coursework evaluation deployment is configured to:

segment the image or video frame to define at least one region of interest;

extract, for the segmented at least one region of interest, a particular computationally defined feature of the second set; and apply the trained classifier to the extracted second set of computationally defined features and, based thereon, assigns a particular quality score to the coursework submission.

27. The coursework management system as in claim 26, wherein the training subsystem supplies plural additional classifiers with respective instructor or curriculum designer's assigned quality scores and values for computationally defined features extracted from respective instances of the exemplary media content and trains the additional classifiers; and wherein coursework evaluation deployment also applies the trained additional classifiers.

28. The coursework management system as in claim 26, further comprising:

an execution environment, wherein the coursework submission includes software code submitted in satisfaction of a programming assignment or test question, the software code executable in the execution environment to perform, or compilable to execute in the execution environment and perform, digital signal processing to produce output media content;

wherein the exemplary media content includes the output media content produced using the submitted software code; and wherein the particular quality score assigned to the coursework submission is based on the applying of the classifier to the second set of computationally defined features extracted from the output media content produced using the submitted software code.

29. The coursework management system as in claim 28, wherein the output media content includes audio signals processed or rendered by the software code coursework submission.

30. The coursework management system as in claim 26, wherein the classifier implements an artificial neural network (NN), k-nearest neighbor (KNN), Gaussian mixture model (GMM), support vector machine (SVN) or other statistical classification technique.

31. The coursework management system as in claim 26, wherein the training subsystem allows the instructor or curriculum designer to iteratively refine the classifier training based on supply of successive instances of the exemplary media content to the classifier and updates to internal states thereof.

32. The coursework management system as in claim 26, wherein the classifier is implemented using one or more logical binary decision trees, blackboard voting-type methods, or rule-based classification techniques.

33. A coursework management system comprising:

means for selecting or receiving exemplary media content to be used in evaluating coursework submissions, the exemplary media content including a training set of examples each assigned at least one quality score by an instructor or curriculum designer;

means for extracting from each instance of exemplary media content a first set of computationally defined features, for supplying a classifier with both the instructor or curriculum designer's assigned quality score and values for the computationally defined features extracted therefrom and, based on the supplied quality scores and extracted feature values, for training the classifier;

means for accessing a computer readable encoding of media content that constitutes, or is derived from, the coursework submission and extracting therefrom a second set of computationally defined features, wherein the media content that constitutes, or is derived from, the coursework submission includes an image or video signal encoding;

means for segmenting the image or video frame to define at least one region of interest;

means for extracting from the coursework submissions a second set of computationally defined features, including extracting, for the segmented at least one region of interest, a particular computationally defined feature of the second set; and means for applying the trained classifier to the extracted second set of computationally defined features and, based thereon, for assigning a particular quality score to the coursework submission.

* * * * *